May 29, 1923.
O. KONIGSLOW, SR
BRAKE BAND FITTING
Filed Aug. 22, 1921
1,456,605
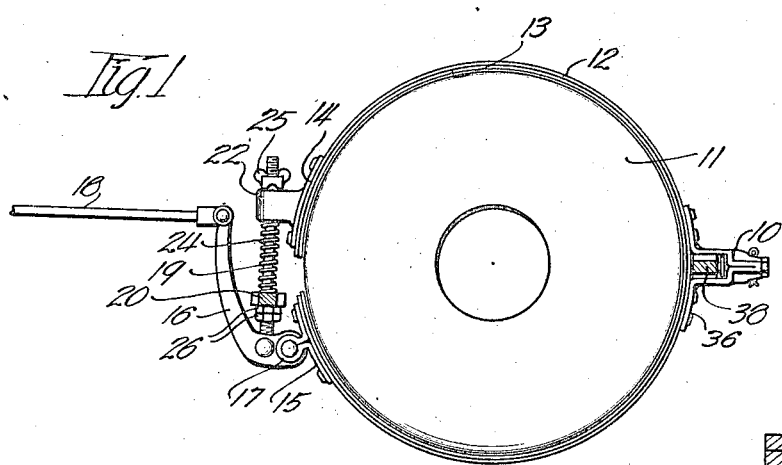
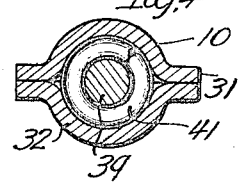
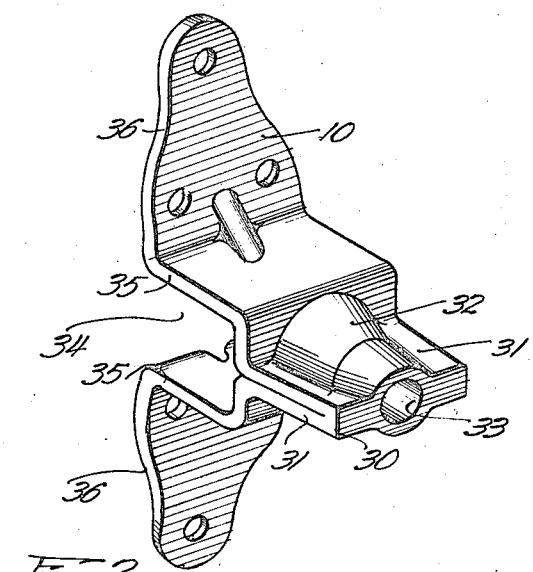
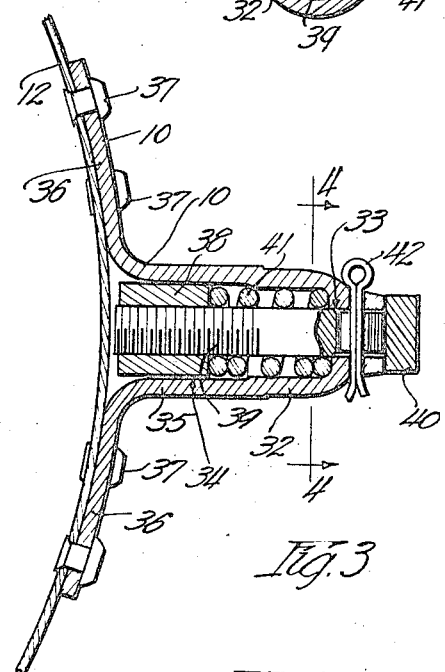
Inventor:
Otto Konigslow, Sr.
Williams, Bradbury,
See, & McCabe
Attys.

Patented May 29, 1923.

1,456,605

UNITED STATES PATENT OFFICE.

OTTO KONIGSLOW, SR., OF CLEVELAND, OHIO, ASSIGNOR TO OTTO KONIGSLOW MANUFACTURING COMPANY, OF CLEVELAND, OHIO, A CORPORATION OF OHIO.

BRAKE-BAND FITTING.

Application filed August 22, 1921. Serial No. 494,343.

*To all whom it may concern:*

Be it known that I, OTTO KONIGSLOW, Sr., a citizen of the United States, and resident of Cleveland, in the county of Cuyahoga, in the State of Ohio, have invented a certain new and useful Improvement in Brake-Band Fittings, of which the following is a full, clear, concise, and exact description, reference being had to the accompanying drawings, forming a part of this specification.

My invention relates to a brake band fitting and more particularly to a fitting comprising a metal stamping adapted to carry the brake band and to receive the braking strain from it.

The chief object of my invention is to provide a fitting of the character described in which the metal, although thin in cross-section, is so disposed as to adequately meet the stress imposed upon it during the braking operation.

Another object of my invention is to provide a device of the character described in which the metal is disposed to form a hub providing means for adjustably securing the brake band relatively to the brake drum to form a slot adapted to receive and be secured to a fixed bar forming part of an automotive vehicle or the like, and to form a plurality of arcuate portions adapted to be rigidly secured to the brake band.

These and other objects of my invention will be more clearly set forth as the following description progresses, reference being had to the accompanying drawings, wherein Figure 1 is a somewhat diagrammatic view of a brake drum and band, and mechanism for operating the structure, the band being secured to and carried by a fitting embodying the novel features of my invention;

Figure 2 is a perspective view of my improved brake band fitting;

Figure 3 is a longitudinal central section taken through my improved brake band fitting;

Figure 4 is a section taken on line 4—4 of Figure 3.

Similar characters of reference indicate similar parts throughout the several views.

In the drawings, I have illustrated my improved brake band fitting in connection with a double acting brake band of the external contracting type, the fitting being designated by the reference character 10.

Referring to Figure 1, it will be noted that the double acting band brake comprises a brake drum 11 around which is disposed a brake band 12. As hereinbefore stated, the structure shown is of the external contracting type, means being provided for drawing the ends of the brake band toward each other so as to cause the brake band lining 13 to frictionally engage the brake drum 11. The means for drawing the ends of the brake band 12 toward each other comprise a bracket 14 secured to one end of the brake band, and a bearing bracket 15 secured to the other end. A brake band lever 16 has one end pivotally secured to the bearing bracket 15 as at 17, and the other end pivotally secured to one end of a brake rod 18. Pivotally secured to the brake band lever 16 at a point intermediate its ends is an adjusting rod 19. The adjusting rod 19 is slidably mounted in a bar 20, which is rigidly secured to any suitable support by means adapted to hold the bar 20 in a fixed position relative to the drum 11. The adjusting rod 19 passes through a lug 22 formed upon the bracket 14. Disposed around the rod 19 and interposed between the lug 22 and the fixed bar 20 is a helical compression spring 24. A wing nut 25 is threaded upon the free end of the adjusting rod 19, and a pair of lock nuts 26—26 are also threaded upon the rod 19, the lock nuts 26—26 being disposed between the fixed bar 20 and the brake band lever 16. It is apparent that the spring 24 will urge the bracket 14 in an upward direction tending to move the brake band 12 away from the brake drum 11. This movement is limited by the wing nut 25 and lock nuts 26—26. The structure shown and described is well known to those skilled in the art, and, briefly, it is operated by means of the brake rod 18 which may be pulled in a direction away from the brake drum 11, causing the lever 16, and rod 19 to draw the brackets 14 and 15 toward each other against the action of the spring 24. As the brackets approach each other, the brake band 12 is contracted until the brake band lining 13 frictionally engages the brake drum 11.

It is the common practice to provide means for adjustably securing the brake band relatively to the brake drum. I will now describe the means whereby I so secure the brake band 12 relatively to the brake drum 11, the means comprising my aforementioned improved brake band fitting 10.

As shown in Figure 2, the brake band fitting 10 comprises preferably a single strip of metal folded upon itself as at 30 to provide a plurality of superimposed layers 31—31. Each superimposed layer is shaped to provide one-half of a hub 32, the hub 32 having an aperture 33 extending through it at right angles to the fold 30. The free ends of the metal strip are bent away from each other to form a slot 34, having side walls 35—35 disposed in planes substantially parallel to the superimposed layers 31—31. Each of the walls 35 terminates in an arcuate portion 36, the arcuate portions 36—36 providing means whereby the brake band 12 may be secured to the fitting 10, as by rivets 37—37.

Referring to Figure 3, it will be noted that the slot 34 provides means whereby the fitting 10 may be slidably mounted upon a bar 38. The bar 38 like the bar 20 is held against movement relative to the brake drum 11, and is rigidly secured to some portion of the device controlled by the band brake. Threaded into the bar 38 is a bolt 39 which is arranged to pass through the aperture 33 provided in the hub 32. The bolt has a head 40 against which the outer end of the hub 32 is held by a spring 41, and urges the hub 32 away from the bar 38 thus withdrawing that side of the brake band 12 secured to the fitting 10 away from the brake drum 11. It is apparent that the head 40 of the bolt 39 limits the distance the brake band may be displaced in this direction by the spring 41, and that the bolt 39 may be tightened to displace the fitting 10 in the opposite direction, thus causing the brake band to approach the brake drum. A cotter pin 42 is adapted to secure the bolt in a plurality of angularly adjusted positions relative to the hub 32.

When the brake band 12 is to be adjusted relatively to the brake drum 11, the operator need only withdraw the cotter pin 42 and turn the bolt 39 in a proper direction to move its head 40 either toward or away from the brake drum, until the brake band is brought to the desired position relative to the brake drum. The spring 41 will hold the fitting 10 against the head 40 of the bolt 39 at all times. The operator may replace the cotter pin (when the band has been properly positioned) as but a slight turn of the bolt will bring the cotter pin slot in the bolt into alignment with the cotter pin holes in the hub 32.

The arcuate portions 36—36 of the fitting 10 are especially adapted to receive the stress imposed upon the brake band during the braking operation and to in turn pass it to the bar 38 as the strips of metal of which the arcuate portions 36—36 are composed lie in planes substantially in line with the stress imposed upon the band. The slot 34 permits the bar 38 to be disposed in close proximity to the brake band, thus enabling the arcuate portions 36—36 to deliver this stress directly to the bar.

In the preferred embodiment of my device, I weld the superimposed layers 31—31 to one another, and while I have described the fitting 10 as being formed of a single strip of metal, it is apparent that it may be made of a plurality of pieces, each piece having a portion corresponding to one of the superimposed layers 31 and each of said portions being welded to the other.

While I have described the details of construction of the preferred form of my invention, it is to be clearly understood that my invention is not limited to these details except by the scope of the appended claims.

Having thus described my invention, what I claim is new and desire to secure by Letters Patent of the United States is:

1. A brake band fitting consisting of a metal stamping having superimposed layers of metal, the layers being shaped to provide an aperture extending at right angles to the axis of the brake band, one end of each of said layers being bent away from the like end of the other to form a slot having its side walls substantially parallel to said layers, each of said ends terminating in an arcuate portion for securing the fitting to a brake band.

2. A stamped metal brake band fiitting comprising superimposed layers of metal, the layers being formed into a hub having an aperture extending radially relatively to the axis of the brake band, one end of each of said layers being bent away from the like end of the other to form a slot having its side walls substantially parallel to the superimposed layers of metal, each of the ends terminating in an arcuate portion for securing the fitting to the brake band.

3. A brake band fitting comprising a single strip of metal folded upon itself to provide superimposed layers, the layers forming a hub having a cylindrical aperture, the axis of the aperture being disposed at substantially right angles to the fold in the metal strip, the superimposed layers being welded to each other, the superimposed layers having their free ends bent away from each other to form a slot, the sides of the slot being substantially parallel to the superimposed layers, each free end terminating in an arcuate portion for securing the fitting to a brake band.

4. A brake band fitting comprising a single strip of metal folded upon itself to provide superimposed layers, the layers forming a hub, the superimposed layers having their free ends bent away from each other to form a slot, the sides of the slot being substantially parallel to the superimposed layers, each free end terminating in an arcuate portion for securing the fitting to a brake band.

5. The combination of a brake band and a metal stamping for supporting the brake band, the metal stamping consisting of a single strip of metal folded upon itself to provide superimposed layers of metal, the layers forming a hub having a central aperture extending radially relatively to the axis of the brake band, the free ends of the layers being bent away from each other to form a slot extending at right angles to and communicating with said aperture and to form a pair of arcuate portions whereby the stamping is secured to the brake band.

6. A brake band fitting of the character described consisting of a single strip of metal folded upon itself to provide superimposed layers, the layers being formed into a hub having an aperture extending longitudinally of the strip, the free ends of the strip being bent away from each other to form substantially Z-shaped portions having the middle bar of each Z disposed substantially parallel with the superimposed layers and the bars forming the free ends of the Z shaped to conform to the cylindrical surface of the brake band.

7. The method of making a brake band fitting comprising folding a strip of metal upon itself to provide superimposed layers, the layers being formed into a hub having a central aperture extending at right angles to the fold, and bending the free ends away from each other to form a slot having its side walls substantially parallel to the superimposed layers and to provide a pair of arcuate portions for securing the fitting to a brake band.

In witness whereof, I hereunto subscribe my name this 9th day of August, 1921.

OTTO KONIGSLOW, Sr.

Witnesses:
 CHAS. T. THIE,
 ARTHUR G. HENRY.